US008089718B2

(12) United States Patent
Dunn

(10) Patent No.: US 8,089,718 B2
(45) Date of Patent: Jan. 3, 2012

(54) METHOD AND APPARATUS FOR INCREASING STORAGE CAPACITY OF A HARD DISK DRIVE

(75) Inventor: George A. Dunn, San Jose, CA (US)

(73) Assignee: Hitachi Global Technologies, Netherlands B.V., Amsterdam (NL)

(*) Notice: Subject to any disclaimer, the term of this patent is extended or adjusted under 35 U.S.C. 154(b) by 0 days.

(21) Appl. No.: 11/329,592

(22) Filed: Jan. 10, 2006

(65) Prior Publication Data

US 2007/0159711 A1 Jul. 12, 2007

(51) Int. Cl.
*G11B 21/02* (2006.01)
(52) U.S. Cl. .......................................................... 360/75
(58) Field of Classification Search .................. 360/75, 360/51, 31, 245.4, 77.02, 78.04
See application file for complete search history.

(56) References Cited

U.S. PATENT DOCUMENTS

| | | | |
|---|---|---|---|
| 4,978,847 A | 12/1990 | Fukunaga et al. | |
| 5,012,363 A | 4/1991 | Mine et al. | |
| 5,615,058 A * | 3/1997 | Chainer et al. | 360/51 |
| 5,748,398 A | 5/1998 | Seo | |
| 5,875,064 A * | 2/1999 | Chainer et al. | 360/75 |
| 6,064,541 A | 5/2000 | Sasamoto et al. | |
| 6,084,738 A * | 7/2000 | Duffy | 360/75 |
| 6,304,407 B1 | 10/2001 | Baker et al. | |
| 6,388,833 B1 | 5/2002 | Golowka et al. | |
| 6,469,859 B1 * | 10/2002 | Chainer et al. | 360/75 |
| 6,519,107 B1 | 2/2003 | Ehrlich et al. | |
| 6,545,844 B1 * | 4/2003 | Schaenzer et al. | 360/245.4 |
| 6,704,156 B1 | 3/2004 | Baker et al. | |
| 6,707,632 B1 * | 3/2004 | Raphael et al. | 360/75 |
| 6,735,032 B2 * | 5/2004 | Dunn et al. | 360/51 |
| 6,738,205 B1 | 5/2004 | Moran et al. | |
| 6,754,017 B2 * | 6/2004 | Rettner et al. | 360/51 |
| 6,771,443 B2 * | 8/2004 | Szita et al. | 360/51 |
| 6,785,075 B2 * | 8/2004 | Bryant et al. | 360/51 |
| 6,943,977 B2 * | 9/2005 | Yatsu | 360/75 |
| 7,019,926 B2 * | 3/2006 | Chainer et al. | 360/51 |
| 7,095,575 B2 * | 8/2006 | Miyata et al. | 360/31 |
| 7,116,509 B2 * | 10/2006 | Yasuna et al. | 360/75 |
| 7,158,330 B2 * | 1/2007 | Morris et al. | 360/75 |
| 7,161,759 B1 * | 1/2007 | Zhang et al. | 360/75 |

(Continued)

FOREIGN PATENT DOCUMENTS

EP 0437947 A2 7/1991
JP 4023281 1/1992

OTHER PUBLICATIONS

"Self-Servo Writing method"IBM TDB, Oct. 1990, pp. 263ff.

(Continued)

*Primary Examiner* — Fred Tzeng

(57) ABSTRACT

A method and apparatus for improving the capacity of a hard disk drive is provided. In one embodiment, a portion of timing information is written to a first disk prior to coupling the first disk with a hard disk drive. The first disk is then coupled with the hard disk drive having a read element aligned with a write element on a head portion of a head gimbal assembly. The timing information is then provided to the read element during a writing of a set of servo track information on the disk, wherein the portion of timing information allows the read element to be aligned with the write element on the head during the writing of the set of servo track information.

28 Claims, 8 Drawing Sheets

U.S. PATENT DOCUMENTS

| | | | | |
|---|---|---|---|---|
| 2001/0033451 | A1* | 10/2001 | Miles | 360/75 |
| 2002/0101672 | A1* | 8/2002 | Chainer et al. | 360/51 |
| 2003/0214747 | A1* | 11/2003 | Baral | 360/75 |
| 2004/0004783 | A1 | 1/2004 | Takaishi et al. | |
| 2004/0075935 | A1 | 4/2004 | Yatsu | |
| 2005/0002120 | A1* | 1/2005 | Chainer et al. | 360/51 |

OTHER PUBLICATIONS

"Architecture and Performance of the ESPER-2 Hard-Disk Drive Servo Writer" Journal Research Development vol. 37, No. 1, Jan. 1993 pp. 3ff.

* cited by examiner

METHOD AND APPARATUS FOR INCREASING STORAGE CAPACITY OF A HARD DISK DRIVE

TECHNICAL FIELD

The present invention relates to the field of hard disk drives, and more particularly to techniques for increasing the storage capacity of a hard disk drive.

BACKGROUND ART

Hard disk drives are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model was established approximately 50 years ago and resembles a phonograph. That is, the hard drive model includes a storage disk or hard disk that spins at a standard rotational speed. An actuator arm with a suspended slider is utilized to reach out over the disk. The arm carries a head assembly that has a magnetic read/write transducer or head for reading/writing information to or from a location on the disk. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the read-write heads, via the head gimbal assembly, over the specific track location and the read head reads the information from the disk. In the same manner, when a request for a write of a specific portion or track is received, the hard disk aligns the read-write heads, over the specific track location and the head writes the information to the disk.

Over the years, the disk and the head have undergone great reductions in their size. Much of the refinement has been driven by consumer demand for smaller and more portable hard drives such as those used in personal digital assistants (PDAs), MP3 players, and the like. For example, the original hard disk drive had a disk diameter of 24 inches. Modern hard disk drives are much smaller and include disk diameters of less than 2.5 inches (micro drives are significantly smaller than that).

Advances in magnetic recording are also primary reasons for the reduction in size. For example, advances have led to storage capacities in the range of 120 gigabytes (GB) per square inch of disk real estate. Thus, multi-hard disk drives have capacities in the range hundreds of gigabytes. In the present environment, even small improvements in storage techniques can produce large absolute changes in total capacity. For example, a 4% improvement in the capacity of a 250 GB hard disk drive results in an extra 10 GB of additional storage capacity. This is more than the original capacity of hard disk drives offered in the late 1990's.

Presently, the read-write head position geometry on the slider has evolved to meet the needs for both the increased magnetic density and better servo tracking methods. For example, current methods for obtaining timing information for a read-write operation make use of the previously written track, thereby avoiding having to use a clock track. This improvement is important and is not to be abandoned. However, in order to utilize the previously written track information the read-write head geometry is formed in an offset manner to allow the read-write head to read the previous track information across the entire disk surface area. As a result of the current read-write head offset geometry, valuable amounts of disk surface real estate are wasted (sacrificed) in the servo track read-write activity.

For example, as shown in Prior Art FIG. 1, when the head gimbal assembly (HGA) 102A is reading at the inside diameter 111 location, the read-write head is oriented in a different direction than when the HGA 102B is oriented on the outside diameter 121 of the disk 115.

Prior Art FIG. 2 provides a view of the bottom of the head 211 shows the different orientation of the head 211 as shown in inside diameter 111 versus the outside diameter 121. In general, Prior Art FIG. 2 depicts the alignment of the read-write head as previously mentioned. During the writing of the servo information track the read head 204 is required to read the previously writing servo track information 231 and use the timing information to write the next servo track information 233 at the outermost diameter 121 of the disk 115. The separation between the read head 204 and the write head 208 is determined by the outermost diameter 121 and the requirement for the read head 204 to read the previous servo track information 231 and the requirement for the write head 208 to write the last servo track information 203 at the outermost diameter of the disk 121

Referring now to Prior Art FIG. 3, a diagram of the offset read-write elements on the head 211 illustrating the loss of disk surface real estate is shown. In operation, in order for the write elements 208 to begin writing, the read element 204 must stop reading. This step creates a costly and undesirable unused space 308 where nothing can be written because the read element 204 has not yet stopped reading. In addition, this wasted space grows as the HGA moves from the inside diameter 111 to the outside diameter 121 due to the geometry of the read-write elements.

SUMMARY

A method and apparatus for improving the capacity of a hard disk drive is provided. In one embodiment, a portion of timing information is written to a first disk prior to coupling the first disk with a hard disk drive. The first disk is then coupled with the hard disk drive having a read element aligned with a write element on a head portion of a head gimbal assembly. The timing information is then provided to the read element during a writing of a set of servo track information on the disk, wherein the portion of timing information allows the read element to be aligned with the write element on the head during the writing of the set of servo track information.

BRIEF DESCRIPTION OF THE DRAWINGS

Prior Art

Prior Art

Prior Art

BEST MODES FOR CARRYING OUT THE INVENTION

Reference will now be made in detail to the alternative embodiments of the present invention, an apparatus and method for increasing the capacity of a hard disk drive. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

Overview

In general, embodiments of the present invention provide an improvement in available disk surface real estate by reconfiguring the permanent servo pattern writing process to allow the read-write elements to be aligned on the head of the HGA within the hard disk drive (HDD) assembly. This alignment between the read and write elements on the head allows a significant recapture of otherwise wasted disk real estate.

In one embodiment, timing information is written to a first disk prior to its assembly in the HDD. This is referred to as pre-written timing information herein since the process is performed prior to the coupling of the disk with the HDD. The disk is then placed into a HDD having aligned read and write elements on the head of the HGA. At a formatting step, the pre-written timing information 525 is used as one of the reference points when generating the permanent written servo track information 625 thereby removing the need for the non-aligned read-write elements as described in the prior art. In one embodiment, after the permanent written servo track information is written, the pre-written servo track timing information can then be over-written.

Figure 7:
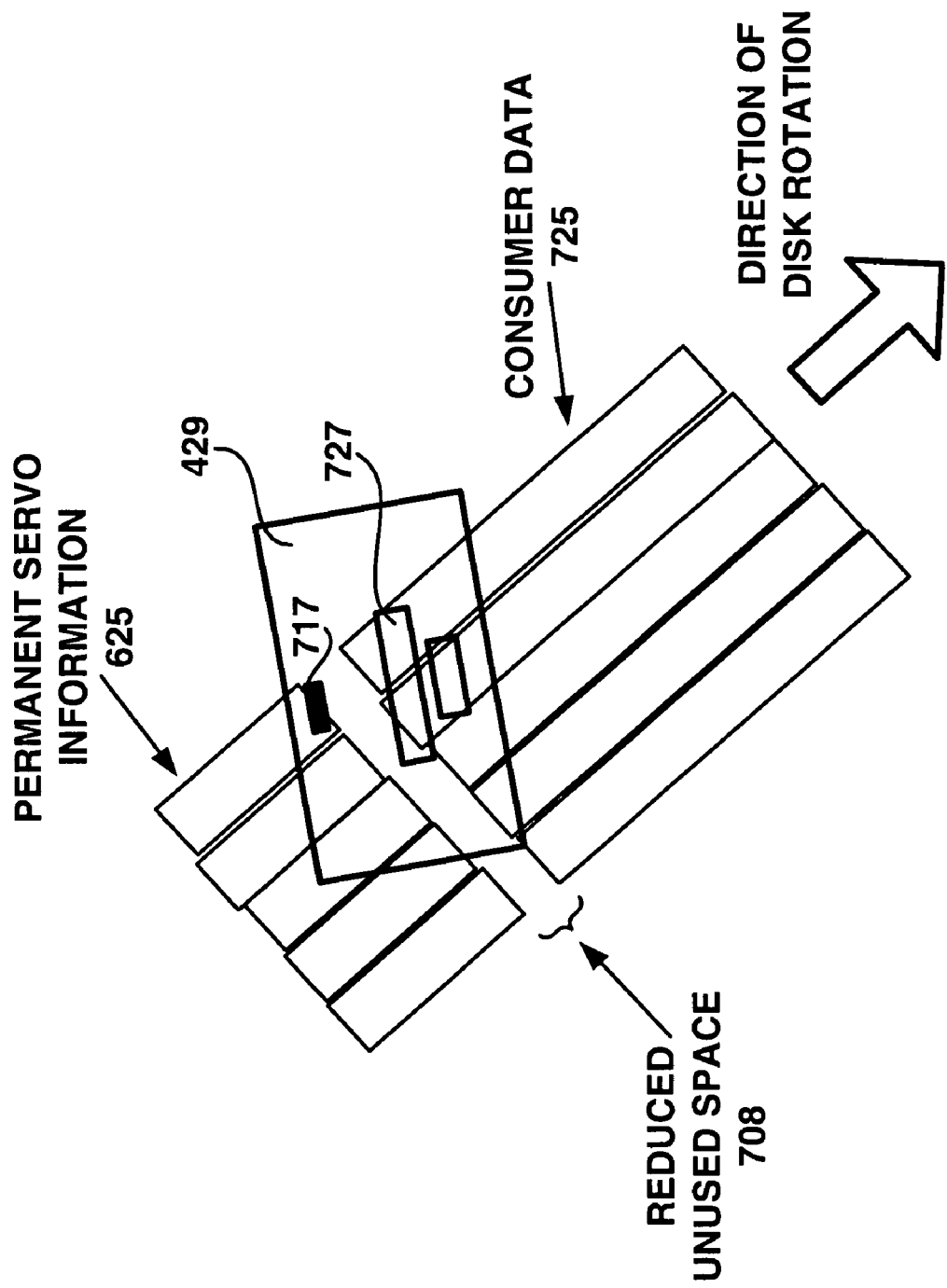
FIG. 7 is a diagram of the aligned read-write element head configuration is shown in accordance with an embodiment of the present invention.

The pre written servo timing information 525 removes the requirement for the offset between the read head 204 and the write head 208. The offset can be reduced to zero as shown in FIG. 7 with the read head 717 and the write head 727 aligned about the center line of the slider 429

Figure 1:
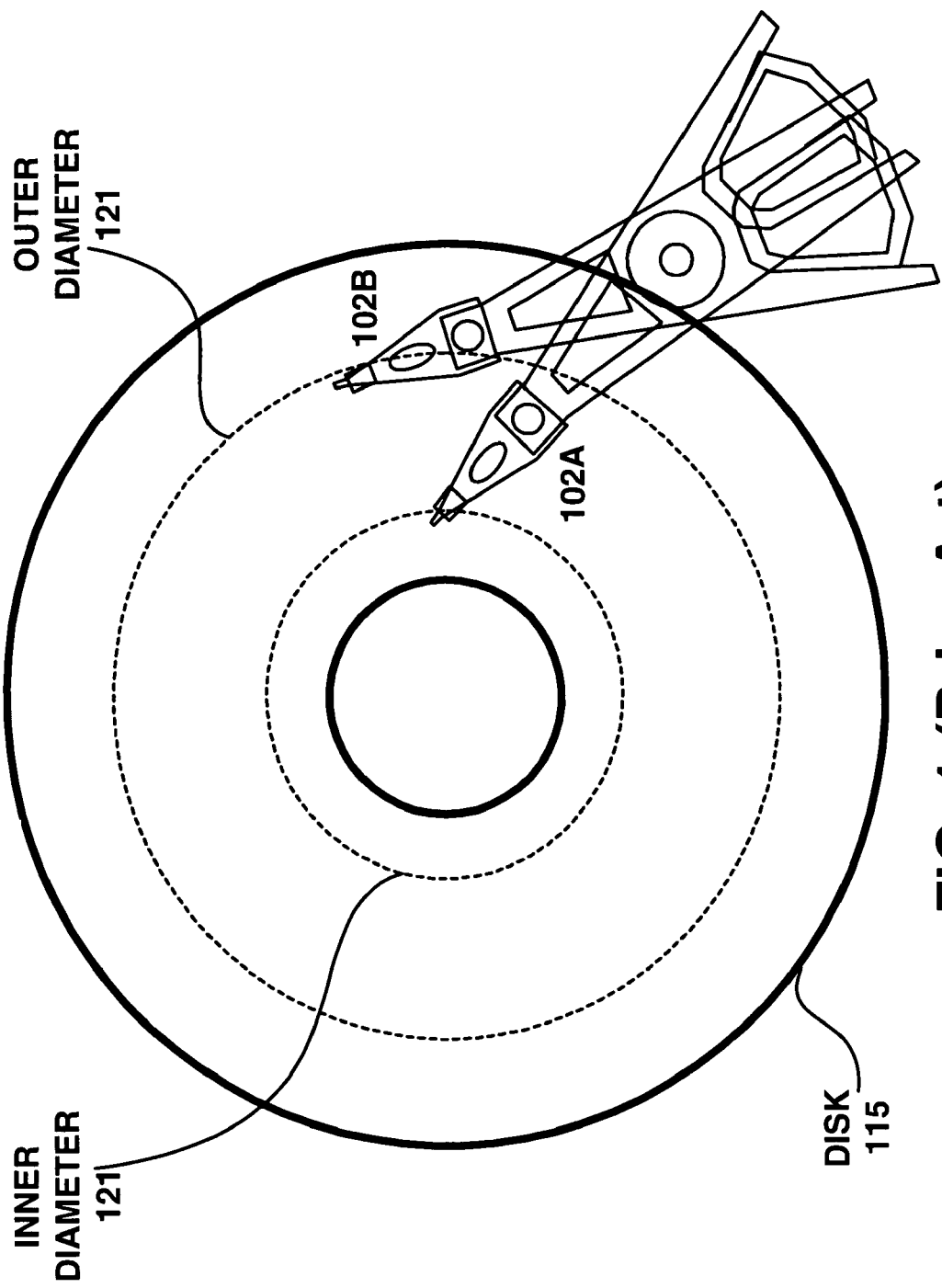
FIG. 1 is a schematic top plan view of a hard disk drive showing the slider arm in two positions.
Figure 2:
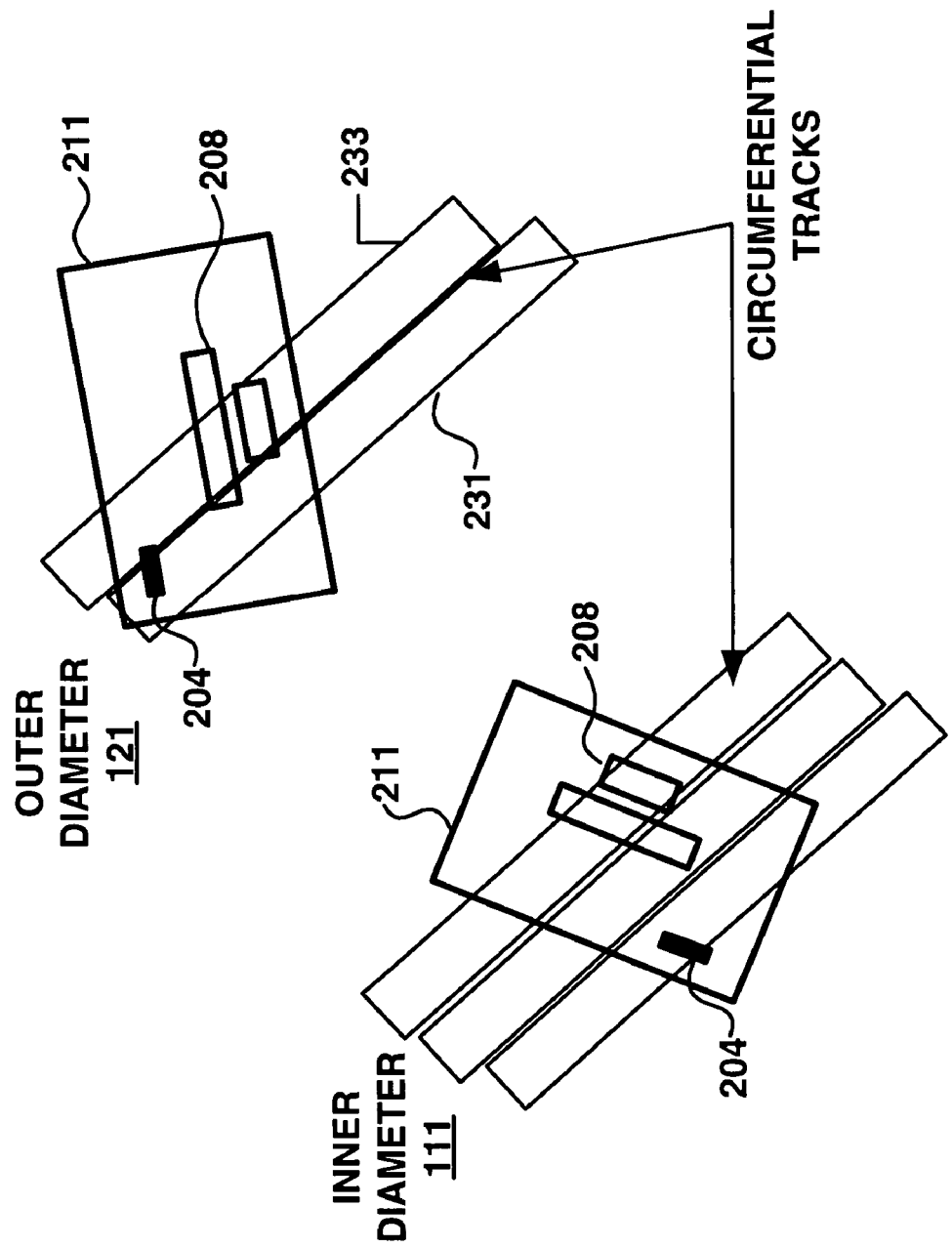
FIG. 2 is a diagram of a prior art head having read-write elements thereon depicted in two positions on the disk.
Figure 3:
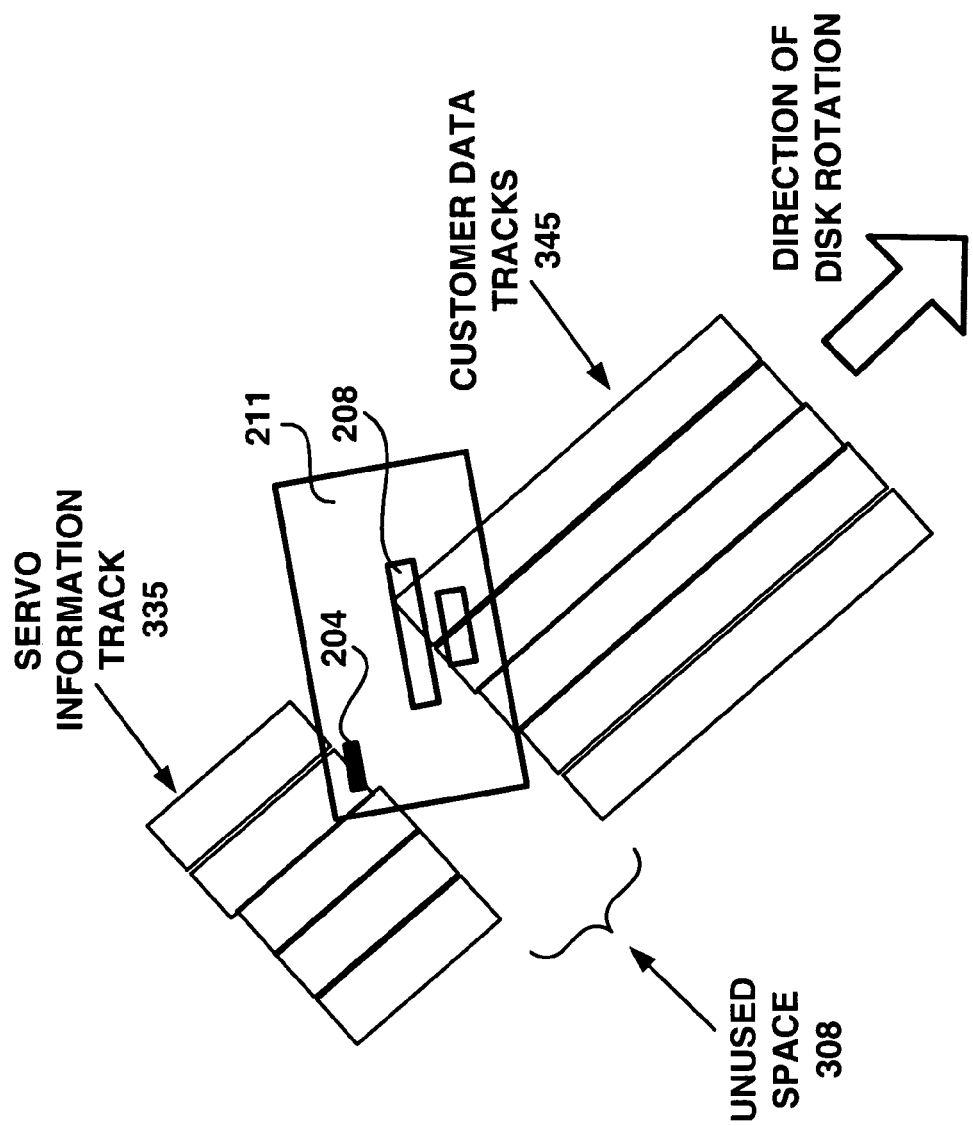
FIG. 3 is a diagram depicting the unused space on the disk when the read element is still reading the disk and before the write head can begin to write on the disk.
Figure 4:
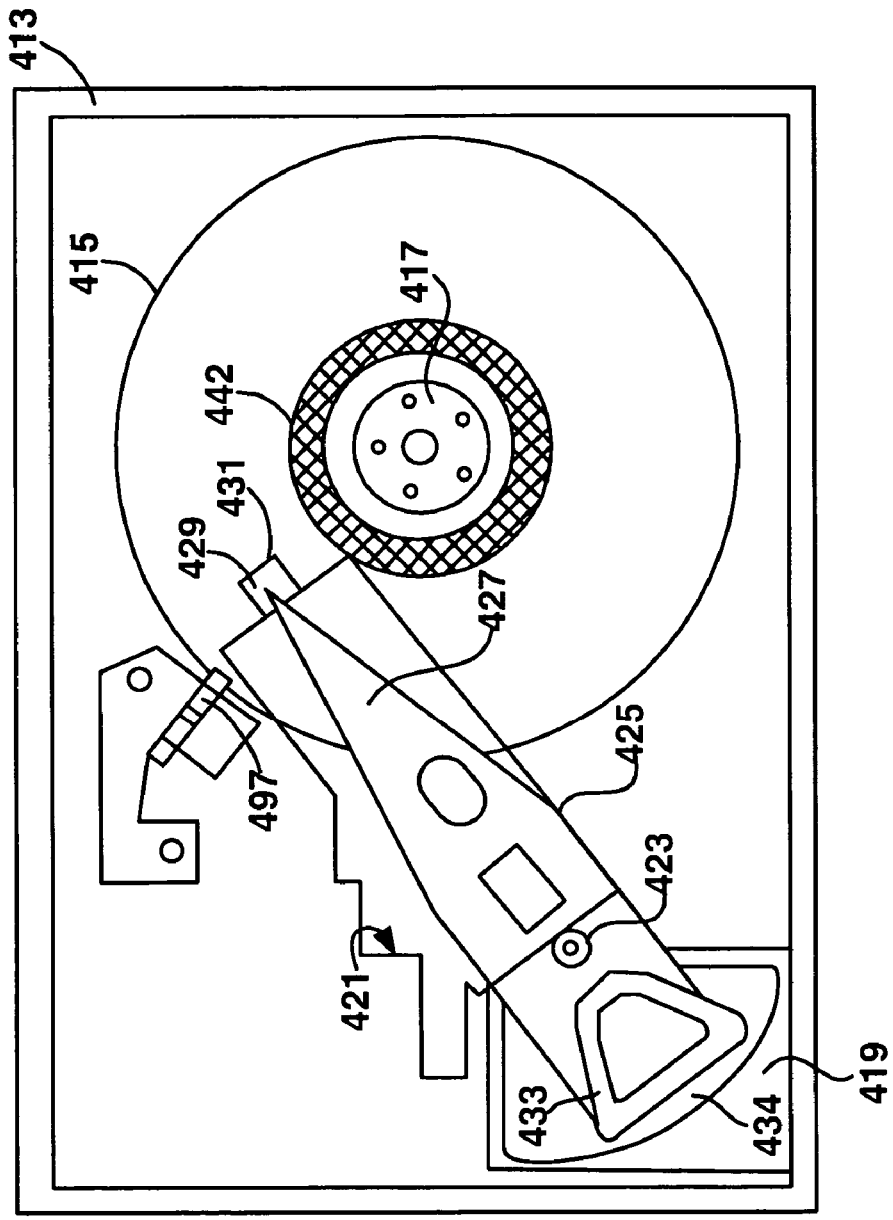
FIG. 4 is a schematic top plan view of a hard disk drive, in accordance with one embodiment of the present invention.

With reference now to FIG. 4, a schematic drawing of one embodiment of an information storage system comprising a magnetic hard disk file or drive 411 for a computer system is shown. Embodiments of the invention are well suited for utilization on a plurality of hard disk drives. The utilization of the driver of FIG. 4 is merely one of a plurality of hard disk drives that may be utilized in conjunction with the present invention. For example, in one embodiment the hard disk drive 411 would use load/unload (L/UL) techniques with a ramp 497 and a nose limiter. In another embodiment, the drive 411 is a non L/UL drive, for example, a contact start-stop (CSS) drive having a textured landing zone 442 away from the data region of disk 415.

In the exemplary FIG. 4, Drive 411 has an outer housing or base 413 containing a disk pack having at least one media or magnetic disk 415. A spindle motor assembly having a central drive hub 417 rotates the disk or disks 415. An actuator 421 comprises a plurality of parallel actuator arms 425 (one shown) in the form of a comb that is movably or pivotally mounted to base 413 about a pivot assembly 423. A controller 419 is also mounted to base 413 for selectively moving the comb of arms 425 relative to disk 415.

In the embodiment shown, each arm 425 has extending from it at least one cantilevered ELS 427. It should be understood that ELS 427 is, in one embodiment, an integrated lead suspension (ILS) that is formed by a subtractive process. In another embodiment, ELS 427 is formed by an additive process, such as a Circuit Integrated Suspension (CIS). In yet another embodiment, ELS 427 may be a Flex-On Suspension (FOS) attached to base metal or it may be a Flex Gimbal Suspension Assembly (FGSA) that is attached to a base metal layer. The ELS may be any form of lead suspension that can be used in a Data Access Storage Device, such as a HDD. A magnetic read/write transducer 431 or head is mounted on a slider 429 and secured to a flexure that is flexibly mounted to each ELS 427. The read/write heads magnetically read data from and/or magnetically write data to disk 415. The level of integration called the head gimbal assembly is the head and the slider 429, which are mounted on suspension 427. The slider 429 is usually bonded to the end of ELS 427.

ELS 427 has a spring-like quality, which biases or presses the air-bearing surface of the slider 429 against the disk 415 to cause the slider 429 to fly at a precise distance from the disk. ELS 427 has a hinge area that provides for the spring-like quality, and a flexing interconnect (or flexing interconnect) that supports read and write traces through the hinge area. A voice coil 433, free to move within a conventional voice coil motor magnet assembly 434 (top pole not shown), is also mounted to arms 425 opposite the head gimbal assemblies. Movement of the actuator 421 (indicated by arrow 435) by controller 419 causes the head gimbal assemblies to move along radial arcs across tracks on the disk 415 until the heads settle on their set target tracks. The head gimbal assemblies operate in a conventional manner and always move in unison with one another, unless drive 411 uses multiple independent actuators (not shown) wherein the arms can move independently of one another.

In general, the load/unload drive refers to the operation of the ELS 427 with respect to the operation of the hard disk drive. That is, when the disk 415 is not rotating, the ELS 427 is unloaded from the disk. For example, when the hard disk drive is not in operation, the ELS 427 is not located above the disk 415 but is instead located in a holding location away from the disk 415 (e.g., unloaded). Then, when the hard disk drive is operational, the disk(s) are spun up to speed, and the ELS 427 is moved into an operational location above the disk(s) 415 (e.g., loaded). In so doing, the deleterious encounters between the slider and the disk 415 during non-operation of the HDD 411 are greatly reduced. Moreover, due to the movement of the ELS 427 to a secure off-disk location during non-operation, the mechanical shock robustness of the HDD is greatly increased.

Operation

Figure 5:
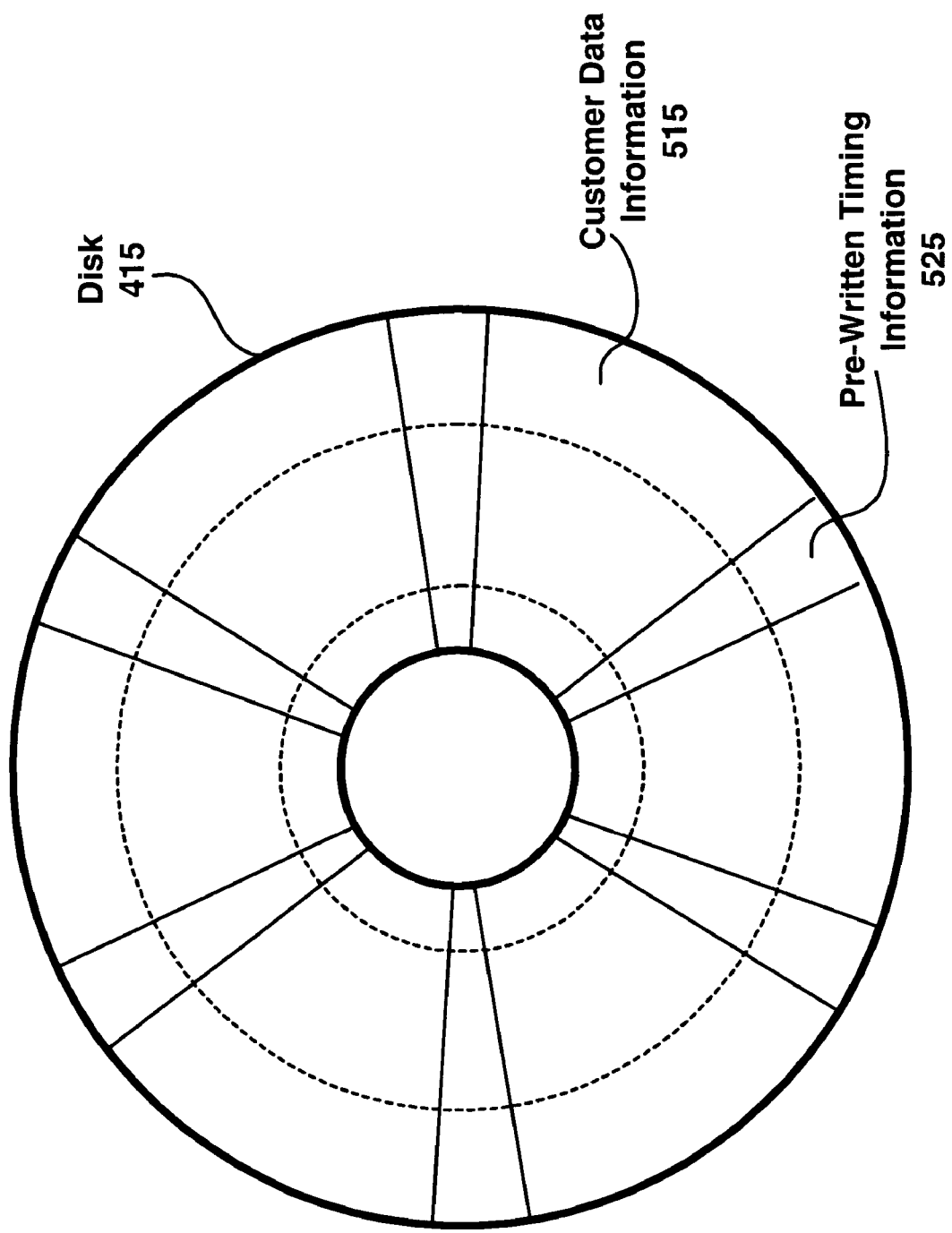
FIG. 5 is a diagram of a disk having circumferential tracks of pre-written timing information in accordance with an embodiment of the present invention.

With reference now to FIG. 5, a diagram 500 of a disk having circumferential tracks of pre-written timing information is shown in accordance with an embodiment of the present invention. As stated herein, the pre-written timing information 525 is placed on the disk 415 prior to the disk 415 being assembled into the HDD. In general, a stand-alone servo-writer (or similar) is used to write the timing pattern for the pre-written timing information 525.

Figure 6:
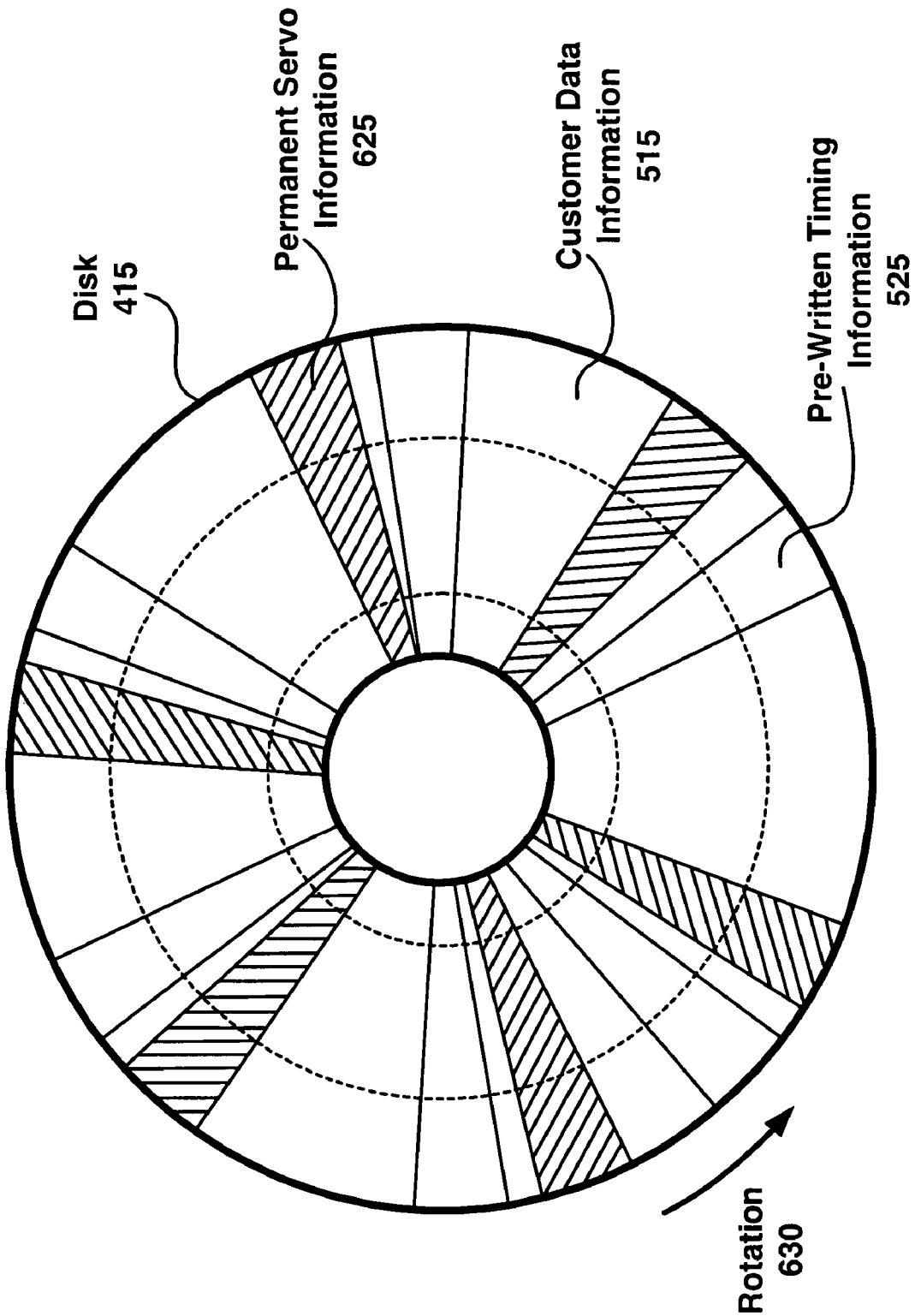
FIG. 6 is a diagram of a disk depicting the permanent servo pattern and the pre-written timing information in accordance with an embodiment of the present invention.

In one embodiment, as shown in FIG. 6, the pre-written timing information address mark pattern is selected based on ease of detection and read capability. For example, the address mark detection should be different than the permanent servo information 625 so that it will not be misread before the pre-written servo information 525 is overwritten by data. This pre-written servo timing information will then be read and utilized to update the phase lock loop during the writing of the permanent servo information 625 described in detail herein. In one embodiment, the writing of the timing information is performed on a writing assembly having a head with offset read and write elements. That is, the writing of the timing information will utilize the previous track timing information to provide the cues to the read and write elements for establishing the timing information correctly across the entire disk.

However, due to the problems associated with circumferential offset known as repeatable run out at the fundamental frequency of rotation, the center of the track during pre-write cannot be guaranteed to be the center of the track when the disk 415 is assembled in the HDD 411. Importantly, since only timing information is used and the disk 415 is mounted on the center of rotation when the servo track timing information 525 is written, the repeatable run out that occurs after assembling the disk 415 into the HDD is overcome by utilizing the servo writer pusher in conjunction with the servo track timing information 525 which is described in detail herein.

With reference again to FIG. 6, a diagram 600 of a disk depicting the permanent servo pattern and the pre-written timing information is shown in accordance with an embodiment of the present invention. As described herein, the diagram 600 depicts a disk 415 having pre-written timing information 525 thereon after it is assembled within a HDD such as HDD 411 of FIG. 4. Diagram 600 also includes permanent servo information 625 shown to the right of the pre-written timing information 525 wedges. In one embodiment, the formation of the permanent servo information 625 wedges is provided by utilizing the pre-written timing information 525 in conjunction with the servo writer pusher to ensure that the permanent servo information 625 is written at the true center of rotation of the completed hard disk drive thereby removing the problems associated with repeatable run out.

With reference now to FIG. 7, a diagram of the aligned read-write element head configuration is shown in accordance with an embodiment of the present invention. By aligning the read 717 and write 727 elements of the head 429, the unused space 708 on the disk is reduced. This change in position of the read element 717 on the head puts it back in line with the write head 727 as shown. The width of the gap (e.g., unused space 708) between the end of reading and beginning of writing is now smaller resulting in reduced unused space 708 as compared with the unused space in the offset read-write elements 308 of the prior art. By aligning the read and write head, the realized increase in storage space on the disk is on the order of 1-4% or greater per disk 415 of the HDD.

Figure 8:
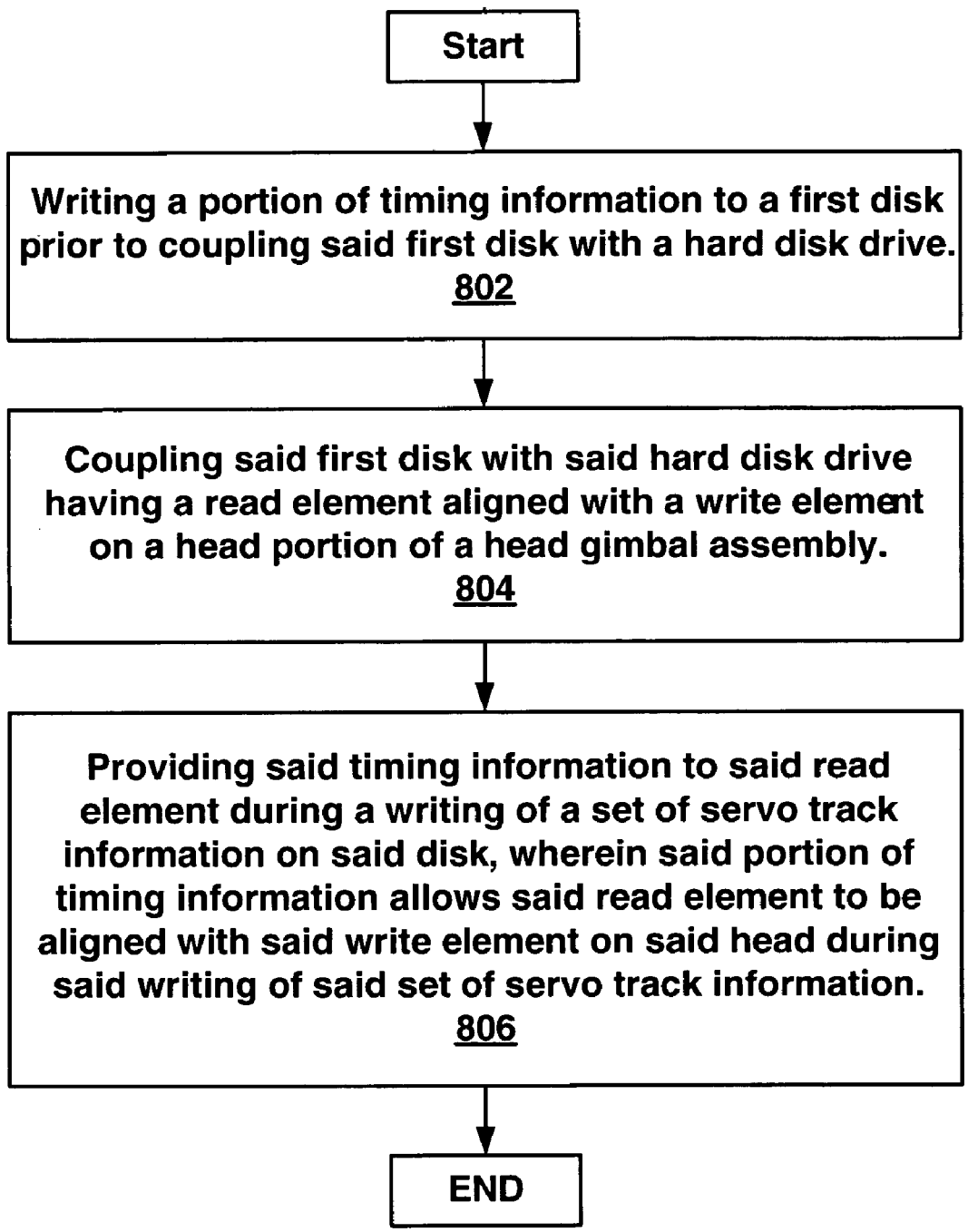
FIG. 8 is a flowchart of a method for increasing the storage capacity of a hard disk drive in accordance with one embodiment of the present invention.

With reference now to FIG. 8, a flowchart 800 of a method for increasing the storage capacity of a hard disk drive is shown in accordance with one embodiment of the present invention. In general, the method avoids the need for obtaining information from previously written tracks, thereby allowing the geometry of the read write head to be adjusted for maximum use of disk real estate while avoiding the requirement for a clock track. In addition, embodiments are able to utilize the method for increasing the storage capacity of a disk described herein on a hard disk drive containing more than one disk.

With reference now to step 802 of FIG. 8 and to FIG. 5, one embodiment writes a portion of timing information 525 to a first disk 415 prior to coupling the first disk 415 with a hard disk drive. In general, the timing information 525 is written utilizing a servo writer and a standard disk writing methodology. However, unlike the prior art approach, the timing information 525 is written on the disk 415 before the disk 415 is coupled with the hard disk drive.

In one embodiment, the writing of the portion of timing information utilizes an address mark detection that is different from a product detection mark on the disk. In addition, the timing information is repeated in a wedge pattern as a function of a degree of separation on the disk. That is, as described herein, the timing information 525 wedges are provided at degree intervals across the surface of the disk 415. For example, the timing information 525 is provided at five-degree intervals across the surface of the disk. In another embodiment, the timing information is provided at less than five-degree intervals. In yet another embodiment, the timing information is provided at greater than five-degree intervals. In other words, the repeating wedge pattern may be configured in a plurality of possible proportions as long as the overall timing information 525 is formatted to allow sufficient disk space for the production of the permanent servo pattern without overwriting the series of tracks of timing information 525 during the production process. That is, there must be enough customer data information space 515 to allow the permanent servo information to be written without the permanent servo information overwriting the pre-written timing information 525.

With reference now to step 804 of FIG. 8 and to FIG. 6 and FIG. 7, one embodiment couples the first disk 415 with the hard disk drive 411 having a read element 717 aligned with a write element 727 on a head portion 429 of a HGA 427. The assembled drive 411 then adds the final complete servo track pattern information 625 to the disk 415. In one embodiment, prior to the writing of the permanent servo track information the frequency error, due to a new center of rotation, is measured and a correction is provided to account for this difference while reading the pre-written servo timing data.

In general, this is performed prior to the permanent servo tracks being written but after the pre-written disk 415 is assembled into the completed hard disk drive. This process is utilized to account for the fact that the pre-written timing information was written on a separate servo writing machine with a different center of rotation for the disk 415. Therefore, when the disk 415 is assembled into the hard disk drive 411, the new center of rotation is not likely to be in exactly the same point as the first center of rotation. The new center of rotation will produce a slight eccentricity in the rotation of the disk 415, which in turn introduces a frequency shift when the read element is positioned at the true center of rotation of the assembled hard disk drive. In one embodiment, this error is corrected by measuring the highest and the lowest frequency shifts during half a rotation of the disk and incorporating a correction during the copying process when reading from the pre-written information 525 and writing the permanent servo information 625.

With reference now to step 806 of FIG. 8 and to FIG. 6 and FIG. 7, one embodiment provides the timing information 525 to the read element 717 during the formation of a set of servo track information 625 on the disk, wherein the portion of timing information 525 allows the read element 717 to be aligned with the write element 727 on the head 429 during the writing of the set of servo track information 625.

In one embodiment, the permanent servo information 625 is written on the disk 415 utilizing the pre-written timing information 525 in conjunction with a servo writer pusher and center of rotation correction to ensure that the set of servo track information is written at a true center of rotation of the disk. For example, when the process of writing the permanent servo information 625 is initiated, the actuator pushes the arm 425 to the inner diameter of the disk, e.g., to the innermost stop. Once the HGA 427 reaches the inner stop, a first known point is established. The disk 415 then begins to rotate in a counter clockwise rotation 630.

During the rotation, when a pre-written timing track 525 is encountered, the read element 717 reads the timing information. Once the read element 717 is passed the pre-written timing track 525, the write elements 727 begin to write the permanent servo information (e.g., track center location, track number, and the like) on the disk 415. After the permanent servo information 625 portion is written, the write element 727 waits for the next signal to write from the read element 717. That is, the disk 415 rotates until the read element 717 crosses the next pre-written timing information 525 and then after the read element 717 reaches the end of the pre-written timing information 525, the write elements 727 begin to write the next portion of permanent servo track information 625. Therefore, in one embodiment, the number of permanent servo track information 625 portions on the disk is directly related to the number of pre-written timing information 525 portions.

Once the first track (e.g., inside most track) of permanent servo information 625 is completed, the servo writer pusher in conjunction with a laser guidance system will move the actuator 425 and therefore, the HGA 427 and head 429 the correct distance to begin writing the permanent servo information 625 on the second track of the disk 415. This process, of moving the actuator micro distances and then completing a revolution of the disk 415 to ensure the complete permanent servo information 625 is written, is performed for each track on the disk. Therefore, every track on the disk 415 is written without requiring the read element 717 to read the permanent servo information 625, or any other information, from the previous track. In so doing, the read element 717 is capable of being aligned with the write element 727 on the head 429.

In one embodiment, after the complete permanent servo track information 625 is written to the disk, the write protection for the pre-written timing information 525 is removed. In so doing, the space occupied by the pre-written timing information 525 is freed for being overwritten by consumer data 725. However, by having the permanent servo information written within a HDD having aligned read and write elements, the permanent servo information will be correctly centered about the point of rotation of the disk and repeatable run out will be significantly reduced or completely removed. In addition, the result of having a HDD with an aligned read element 717 and write element 727 is a reduction in the unused disk space 708 between the permanent servo information 625 and the consumer data portions 725. As stated herein, this reduction may save approximately 4% of the disk space which is a significant savings. This savings is even more significant in a HDD having a plurality of disks 415 therein where 4% is saved per disk.

With reference still to step 806 of FIG. 8, one embodiment couples at least one additional disk with the hard disk drive and utilizes the timing information on the first disk as a guide for writing a set of servo track information on the additional disk. That is, only the first disk in the stack needs to have the pre-written timing information 525 thereon. In one embodiment, the highest and lowest frequency shift in rotation rate are measured for the first disk after coupling the first disk with the hard disk drive. Then, a compensating value representing the frequency shift is determined. The compensating value is then used when reading timing information from the first disk and applying it to each of the additional disks in the disk pack.

Therefore, the present invention provides a method for improving storage capacity of a disk of a hard disk drive. Embodiments further provide a method for improving storage capacity of a disk of a hard disk drive which utilizes industry standard permanent servo information. In addition, embodiments provide a method for improving storage capacity of a disk of a hard disk drive which avoids the requirement for a clock track.

While the method of the embodiment illustrated in flow chart 800 show specific sequences and quantity of steps, the present invention is suitable to alternative embodiments. For example, not all the steps provided for in the methods are required for the present invention. Furthermore, additional steps can be added to the steps presented in the present embodiment. Likewise, the sequences of steps can be modified depending upon the application.

The alternative embodiment(s) of the present invention, a method and apparatus for increasing the capacity of a hard disk drive is thus described. While the present invention has been described in particular embodiments, it should be appreciated that the present invention should not be construed as limited by such embodiments, but rather construed according to the below claims.

What is claimed is:

1. A method for improving storage capacity of a disk of a hard disk drive, said method comprising:
    writing a portion of timing information to a first disk prior to coupling said first disk with a hard disk drive;
    coupling said first disk with said hard disk drive having a read element center aligned with a write element on a head portion of a head gimbal assembly, said read element center aligned with respect to said write element about a center line of said head portion; and
    providing said timing information to said read element during a writing of a set of servo track information on said disk, wherein said portion of timing information allows said read element to be aligned with said write element on said head during said writing of said set of servo track information.

2. The method of claim 1 further comprising:
    utilizing a servo writer pusher in conjunction with said portion of timing information to ensure that said set of servo track information is written at a true center of rotation of said disk after said disk is coupled with said hard disk drive.

3. The method of claim 1 further comprising:
    removing a write protection for said portion of timing information after said complete set of servo track information is written to said disk.

4. The method of claim 1 wherein said writing said portion of timing information further comprises:
    writing said portion of timing information utilizing an address mark detection that is different from a product detection mark on said disk.

5. The method of claim 1 wherein said timing information comprises:
repeating said timing information in a wedge pattern as a function of a degree of separation on said disk.

6. The method of claim 5 wherein said wedge pattern comprises:
configuring said repeating of said wedge pattern to allow sufficient disk space for final product level servo pattern without overwriting said series of tracks of timing information.

7. The method of claim 1 further comprising:
coupling at least one additional disk with said hard disk drive; and
utilizing said timing information on said first disk as a guide for writing a set of servo track information on said additional disk.

8. The method of claim 7 further comprising:
measuring the highest and lowest frequency shift in rotation rate for said first disk after coupling said first disk with said hard disk drive;
determining a compensating value representing said frequency shift; and
using said compensating value when reading timing information from said first disk.

9. A hard disk drive comprising:
a housing;
a disk pack mounted to the housing and having a plurality of disks that are rotatable relative to the housing, the disk pack defining an axis of rotation and a radial direction relative to the axis;
an actuator mounted to the housing and being movable relative to the disk pack, the actuator having a suspension for reaching over the disk, the suspension having a head gimbal assembly thereon, said head gimbal assembly having a read element aligned with a write element on a head portion of a head gimbal assembly for performing a method for improving storage capacity of a disk of a hard disk drive, said method comprising:
receiving a first disk having pre-written timing information thereon;
coupling said first disk with said hard disk drive; and
utilizing said pre-written timing information on said first disk for writing a set of servo track information on said first disk, wherein said pre-written timing information allows said read element to be center aligned with respect to said write element about a center line of said head during said writing of said set of servo track information.

10. The hard disk drive of claim 9 further comprising:
utilizing a servo writer pusher in conjunction with said pre-written timing information to ensure that said set of servo track information is written at a true center of rotation of said first disk after said first disk is coupled with said hard disk drive.

11. The hard disk drive of claim 9 further comprising:
removing a write protection for said pre-written timing information after said complete set of servo track information is written to said first disk.

12. The hard disk drive of claim 9 wherein said pre-written timing information further comprises:
providing an address mark detection that is different from a product detection mark for said pre-written timing information on said first disk.

13. The hard disk drive of claim 9 wherein said timing information comprises:
repeating said pre-written timing information in a wedge pattern as a function of a degree of separation on said first disk.

14. The hard disk drive of claim 13 wherein said wedge pattern comprises:
configuring said repeating of said wedge pattern to allow sufficient disk space for final product level servo pattern without overwriting said series of tracks of timing information.

15. The hard disk drive of claim 9 further comprising:
utilizing said timing information on said first disk as a guide for writing a set of servo track information on said plurality of disks of said hard disk drive.

16. The hard disk drive of claim 15 further comprising:
measuring the highest and lowest frequency shift in rotation rate for said first disk after coupling said first disk with said hard disk drive;
determining a compensating value representing said frequency shift; and
using said compensating value when utilizing said timing information from said first disk to write said set of servo track information on said plurality of disks of said hard disk drive.

17. A disk storage capacity improver for a disk in a hard disk drive assembly comprising:
a disk coupler for coupling a disk with said hard disk drive, said disk having pre-written timing information thereon; and
a pre-written timing information utilizer for utilizing said pre-written timing information on said disk for writing a set of servo track information on said disk, wherein said pre-written timing information allows said read element to be center aligned with respect to said write element about a center line of said head during said writing of said set of servo track information.

18. The disk storage capacity improver of claim 17 further comprising:
a servo writer pusher for utilization in conjunction with said portion of timing information to ensure that said set of servo track information is written at a true center of rotation of said disk after said disk is coupled with said hard disk drive.

19. The disk storage capacity improver of claim 17 further comprising:
a protection remover for removing a write protection for said pre-written timing information after said complete set of servo track information is written to said disk.

20. The disk storage capacity improver of claim 17 wherein said writing said portion of timing information utilizes an address mark detection that is different from a product detection mark on said disk.

21. The disk storage capacity improver of claim 17 wherein said timing information is repeated in a wedge pattern as a function of a degree of separation on said disk.

22. The disk storage capacity improver of claim 21 wherein said wedge pattern allows sufficient disk space for final product level servo pattern without overwriting said series of tracks of timing information.

23. The disk storage capacity improver of claim 17 further comprising:
at least one additional disk coupled with said hard disk drive; and a first pre-written timing information utilizer for using said timing information on said first disk as a guide for writing a set of servo track information on said additional disk.

24. The disk storage capacity improver of claim 23 further comprising:
a frequency measurer for measuring the highest and lowest frequency shift in rotation rate for said first disk after coupling said first disk with said hard disk drive;
a frequency shift determiner for determining a compensating value representing said frequency shift; and
a compensator for using said compensating value when reading timing information from said first disk.

25. A method for improving storage capacity of a disk of a hard disk drive, said method comprising:
a means for receiving a first disk having pre-written timing information thereon;
a means for coupling said first disk with said hard disk drive; and
a means for providing said timing information to said read element during a writing of a set of servo track information on said disk, wherein said portion of timing information allows said read element to be center aligned with respect to said write element about a center line of said head during said writing of said set of servo track information.

26. The method of claim 25 further comprising:
a means for utilizing a servo writer pusher in conjunction with said pre-written timing information to ensure that said set of servo track information is written at a true center of rotation of said first disk after said first disk is coupled with said hard disk drive.

27. The method of claim 25 further comprising:
a means for utilizing said timing information on said first disk as a guide for writing a set of servo track information on said plurality of disks of said hard disk drive.

28. The method of claim 27 further comprising:
a means for measuring the highest and lowest frequency shift in rotation rate for said first disk after coupling said first disk with said hard disk drive;
a means for determining a compensating value representing said frequency shift; and
a means for using said compensating value when utilizing said timing information from said first disk to write said set of servo track information on said plurality of disks of said hard disk drive.

* * * * *

UNITED STATES PATENT AND TRADEMARK OFFICE
CERTIFICATE OF CORRECTION

PATENT NO. : 8,089,718 B2
APPLICATION NO. : 11/329592
DATED : January 3, 2012
INVENTOR(S) : George A. Dunn Page 1 of 1

It is certified that error appears in the above-identified patent and that said Letters Patent is hereby corrected as shown below:

On the Title page, item [73] Assignee:

Delete: "Hitachi Global Technologies, Netherlands B.V., Amsterdam (NL)"

Insert: --Hitachi Global Storage Technologies, Netherlands B.V., Amsterdam (NL)--

Signed and Sealed this
Thirty-first Day of July, 2012

David J. Kappos
*Director of the United States Patent and Trademark Office*